US007801998B2

(12) United States Patent
Mazzagatte et al.

(10) Patent No.: US 7,801,998 B2
(45) Date of Patent: Sep. 21, 2010

(54) ESTABLISHING AND MAINTAINING A CONNECTION BY A CLIENT TO A SERVER WITHIN A NETWORK

(75) Inventors: Craig M. Mazzagatte, Aliso Viejo, CA (US); Yeongtau Louis Tsao, Irvine, CA (US); Dariusz T. Dusberger, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 12/245,679

(22) Filed: Oct. 3, 2008

(65) Prior Publication Data

US 2010/0088423 A1 Apr. 8, 2010

(51) Int. Cl.
*G06F 15/16* (2006.01)

(52) U.S. Cl. .............................. 709/227; 709/203; 726/3

(58) Field of Classification Search .................. 709/203, 709/229, 227; 726/3
See application file for complete search history.

(56) References Cited

U.S. PATENT DOCUMENTS

| 6,839,732 | B1 | 1/2005 | Vincent et al. | |
|---|---|---|---|---|
| 6,859,836 | B2 * | 2/2005 | Alibakhsh et al. | 709/227 |
| 2004/0003085 | A1 | 1/2004 | Joseph et al. | |
| 2006/0101280 | A1 * | 5/2006 | Sakai | 713/184 |
| 2006/0123123 | A1 * | 6/2006 | Kim et al. | 709/227 |

OTHER PUBLICATIONS

"Designing a Client Socket Pool", http://coding.derkeiler.com/Archive/Java/comp.lang.java.programmer/2004-06/3148.html, dated Jun. 23, 2004. (1 page).

"Client Socket Pool and Reuse", http://saloon.javaranch.com/cgi-bin/ubb/ultimatebb.cgi?ubb=gett_topic&f=8&t=000773, dated Apr. 12, 2002. (3 pages).

"Socket-pool.c", http://koders.com/c/fid2E8055501BC30F2DFD05FEDE1AEA65F23ACFEEB9.aspx?s=%22socket+pool%22, copyright 2004 Charles Kerr. (8 pages).

" Java HTTP Client—Configuration", http://oaklandsoftware.com/product_http/config.html, print date Sep. 5, 2008. (5 pages).

"Class Http URL Connection", http://oaklandsoftware.com/doc/http/javadoc/com/oaklandsw/http/HttpURLConnection.html, print date Sep. 5, 2008. (65 pages).

Tae-Gun Kang, et al., "Design of a Connection Management Module for MOM", Proceedings of the Second International Symposium on Parallel and Distributed Computing (ISPDC'03), IEEE, 2003. (8 pages).

* cited by examiner

*Primary Examiner*—Ario Etienne
*Assistant Examiner*—El Hadji Sall
(74) *Attorney, Agent, or Firm*—Fitzpatrick, Cella, Harper & Scinto

(57) ABSTRACT

A method for establishing and maintaining a connection by a client to a server within a network includes creating a socket for connecting to the server, based on authentication information associated with the client, and connecting to the server using the socket. In addition, the method includes saving the authentication information associated the client. The method further includes in a case where subsequent connection to the server is requested by the client, reconnecting to the server via the socket, based on the saved authentication information. An apparatus for establishing and maintaining a connection by a client to a server within a network is also provided.

14 Claims, 9 Drawing Sheets

US 7,801,998 B2

ESTABLISHING AND MAINTAINING A CONNECTION BY A CLIENT TO A SERVER WITHIN A NETWORK

BACKGROUND OF THE INVENTION

1. Field of the Invention

The invention relates to the field of network connections, and more particularly relates to establishing and maintaining a connection by a client to a server within a network.

2. Description of the Related Art

Some network protocols (e.g., Server Message Block (SMB), Lightweight Directory Access Protocol (LDAP) and Simple Object Access Protocol (SOAP)) may require the use of network sockets to establish a connection, to allow a client to communicate with a server over a network. A socket is an endpoint for communication between two machines.

More specifically, with the use of sockets, a client having a client application therein and a server having a server application therein can be logically connected to one another for the exchange of data. The client application typically initiates a connection with the server application, while the server application waits for the client application to initiate the connection.

In establishing the connection, the client may perform authentication of the client application with the server. For some protocols (e.g., SMB), the client may further require to negotiate the detailed protocol to be used, to setup a session with the server. The client can then use the established connection, or socket, to exchange messages and access data with the server.

However, the creation of sockets is not without problems. For example, the creation of a socket typically requires some form of network negotiation, which utilizes time and resources of the network. Further, in a case where multiple operations are used at same time for a specific application/operation, numerous sockets are opened. The use of multiple sockets at the same time is typically associated with increased use of system resources, possibly causing the client to become constrained.

Thus, there is a need for systems and methods by which the foregoing problems may be avoided.

SUMMARY OF THE INVENTION

Disclosed embodiments describe systems and methods for establishing and maintaining a connection by a client to a server within a network. Certain disclosed embodiments provide for saving authentication information associated a client, and in a case where subsequent connection to a server is requested by the client, connecting to the server by reusing a socket, based on the saved authentication information.

In one aspect of the disclosure, a method for establishing and maintaining a connection by a client to a server within a network is provided. The method includes creating a socket for connecting to the server, based on authentication information associated with the client, and connecting to the server using the socket. In addition, the method includes saving the authentication information associated the client. The method further includes, in a case where subsequent connection to the server is requested by the client, reconnecting to the server via the socket, based on the saved authentication information.

In a further aspect of the disclosure, a computer-readable storage medium storing a computer-executable program for establishing and maintaining a connection by a client to a server within a network is provided. The program includes code for creating a socket for connecting to the server, based on authentication information associated with the client, connecting to the server using the socket, and saving the authentication information associated the client. The program further includes code for, in a case where subsequent connection to the server is requested by the client, reconnecting to the server via the socket, based on the saved authentication information.

In yet a further aspect of the disclosure, an apparatus for establishing and maintaining a connection by a client to a server within a network is provided. The apparatus includes processing logic configured to create a socket for connecting to the server, based on authentication information associated with the client, to connect to the server using the socket, and to save the authentication information associated the client. The processing logic is further configured, in a case where subsequent connection to the server is requested by the client, to reconnect to the server via the socket, based on the saved authentication information.

The client can include an application, and the authentication information can correspond to a user and be associated with the application of the client. Further, the client can include plural applications, and the client can establish and maintain separate sockets for the plural applications.

The reconnecting by the client can include determining if the saved authentication information matches authentication information of the client for the subsequent connection. In a case where it is determined that the saved authentication information matches the authentication information of the client for the subsequent connection, the client can reconnect to the server via the socket. In a case where it is determined that the saved authentication information does not match the authentication information of the client for the subsequent connection, the client can create a new socket for connecting to the server, based on the authentication information of the client for the subsequent connection. The client can further connect to the server using the new socket.

A network protocol for establishing and maintaining the connection can be one of Server Message Block (SMB), Lightweight Directory Access Protocol (LDAP) and Hypertext Transfer Protocol (HTTP).

The client can save the authentication information associated with the client in a cache of the client. The client can save socket identifier information for identifying the socket, and the client can reconnect to the server via the socket, based on the saved authentication information and the saved socket identifier information.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
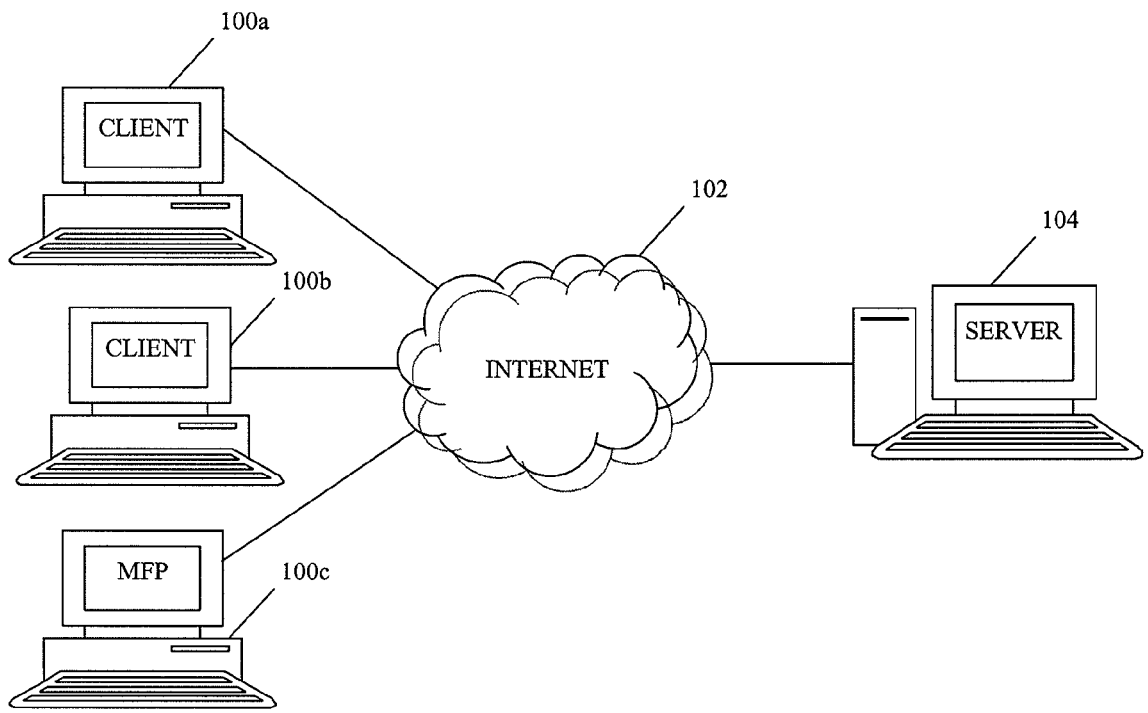
FIG. 1 is a block diagram illustrating an example of a network in which a connection can be established and maintained by a client to a server.

FIG. 1 is a block diagram illustrating an example of a network in which a connection can be established and maintained by a client to a server. Referring to FIG. 1, a series of client devices 100a, 100b and 100c are connected to a server computer 104 via the Internet 102. In the example of FIG. 1, client devices 100a and 100b are depicted as clients (e.g., client computers), and client device 100c is depicted as a Multi Function Printer/Product/Peripheral (MFP). Of course, it should be noted that this is one exemplary arrangement of client devices, and that other arrangements can be used.

Client devices 100a, 100b and 100c may be located within a local area network (LAN), or, each client device 100a, 100b and 100c may be located at separate locations across a wide area network (WAN). It should be noted that the number of client devices and server computers may differ from the number depicted in FIG. 1. Further, it should be noted that while FIG. 1 depicts the relationship between a client device and a server computer as communicating via the Internet 102, the client and server computers may, instead, both be located within a LAN, a private WAN or another type of network.

As noted above, client devices 100a, 100b and 100c (referred hereinafter to as "client device 100") can use an established connection, or socket, to exchange messages and access data with server 104. One method for establishing a connection is to create a connected socket for each operation between client device 100 and server 104, and to close the connection after operation is complete. However, this method may cause performance issues, since a network negotiation typically has to be accomplished each and every time an operation is to be performed. A second method for establishing a connection is to leave the connected connection open and to close the connection only when the client application requests it to be closed or when the application is terminated. However, this method may lower system resources, since many sockets may be opened at the same time. For example, this is potentially problematic on a constrained device such as a Multi Function Printer/Product/Peripheral (MFP).

A possible solution to address the foregoing problems includes allowing a connected socket to remain active for a specified period of time, so that an operation can use the existing connection without necessarily having to rebuild the connection channel. However, this approach typically results in increasing the number of active threads. Also, such a solution lacks a centralized management scheme for retrieving and storing connections, thus moving the responsibility of managing the lifetime of a socket to the caller.

As will be described in further detail below, a central management scheme can be employed to manage the life time of networks sockets, as well as to store and retrieve reusable sockets. Among other things, this scheme can avoid opening multiple sockets at the same time, unless multiple operations are needed at the same time for a specific application/operation. Thus, the number of times sockets are opened can be reduced, and the utilization of system resources can be improved.

Figure 2:
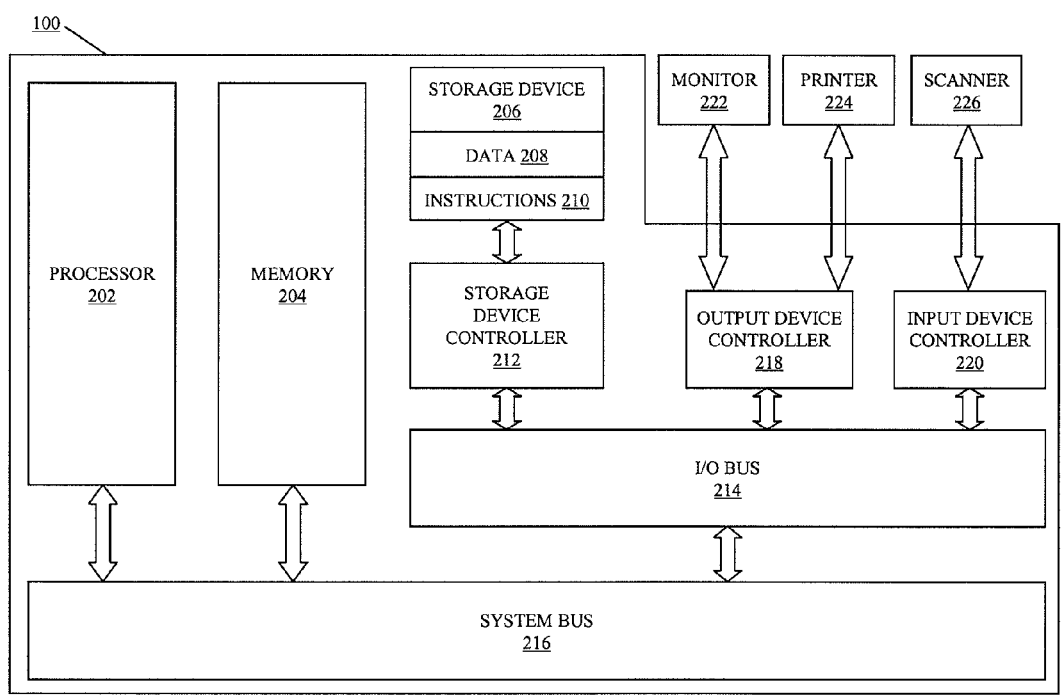
FIG. 2 is a block diagram that illustrates an example of the architecture of a client device shown in FIG. 1.

FIG. 2 is a block diagram that illustrates an example of the architecture of a client device shown in FIG. 1. More specifically, client device 100 may correspond to a data processing system, such as a general purpose computing machine, suitable for hosting a process for establishing and maintaining a connection to a server within a network, in accordance with a representative embodiment. Client device 100 includes a processor 202 coupled to a memory 204 via system bus 216. The processor 202 is also coupled to external Input/Output (I/O) devices via the system bus 216 and an I/O bus 214. A storage device 206 having computer system readable media is coupled to the processor 202 via a storage device controller 212, the I/O bus 214 and the system bus 216. The storage device 206 is used by the processor 202 to store and read data 208 and program instructions 210 used to implement establishing and maintaining a connection to a server within a network as described above. The processor 202 may be further coupled to output devices, such as computer display 222 and printer 224, via an output device controller 218 coupled to the I/O bus 214. The processor 202 may also be coupled to an input device 226, such as a scanner, via an input device controller 220.

In operation, the processor 202 loads the program instructions from the storage device 206 into memory 204. The processor 202 then executes the loaded program instructions 210 to perform, for example, establishing and maintaining a connection to a server within a network.

Figure 3:
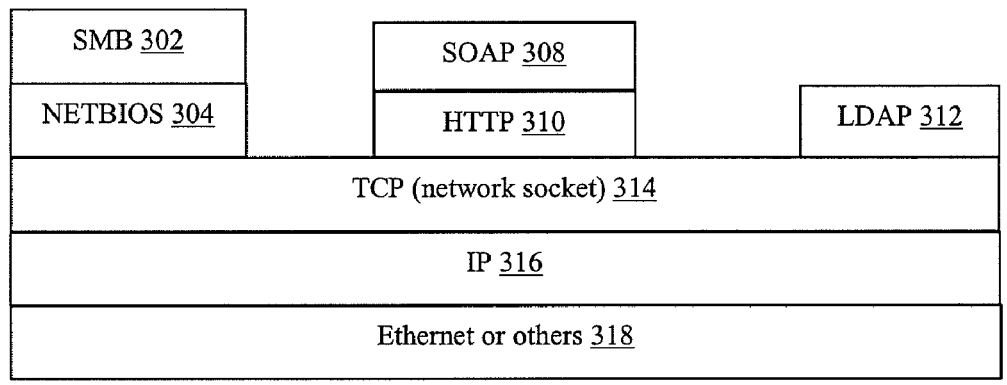
FIG. 3 is a block diagram that illustrates an example of protocols that can utilize network socket(s) for establishing and maintaining a connection by a client to a server.

FIG. 3 is a block diagram that illustrates an example of protocols that can utilize network socket(s) for establishing and maintaining a connection by a client to a server. As noted above, protocols such as SMB, LDAP and SOAP may require the use of network sockets to establish a connection, to allow a client to communicate with a server over a network. The protocol is typically a connect-oriented TCP protocol. Such a connection is typically established at the Transport layer.

The establishing and maintaining of a connection by a client to a server can apply to any protocol that requires authentication with the TCP protocol. As can be seen in FIG. 3, such protocols include, but are not limited to, SMB 302, SOAP 308, HTTP 310 and LDAP 312.

TCP (network socket) 314 represents a network socket. For example, TCP (network socket) network socket 314 may correspond with SmbProtocolSocket 406 of FIG. 4, as described in greater below. As also described later, TCP (network socket) 314 may be reusable if associated with a user's credential information. To make network socket 314 reusable, the specified protocol (e.g., SMB 302, SOAP 308, HTTP 310 and LDAP 312) may also need to maintain protocol-specific context information.

Figure 4:
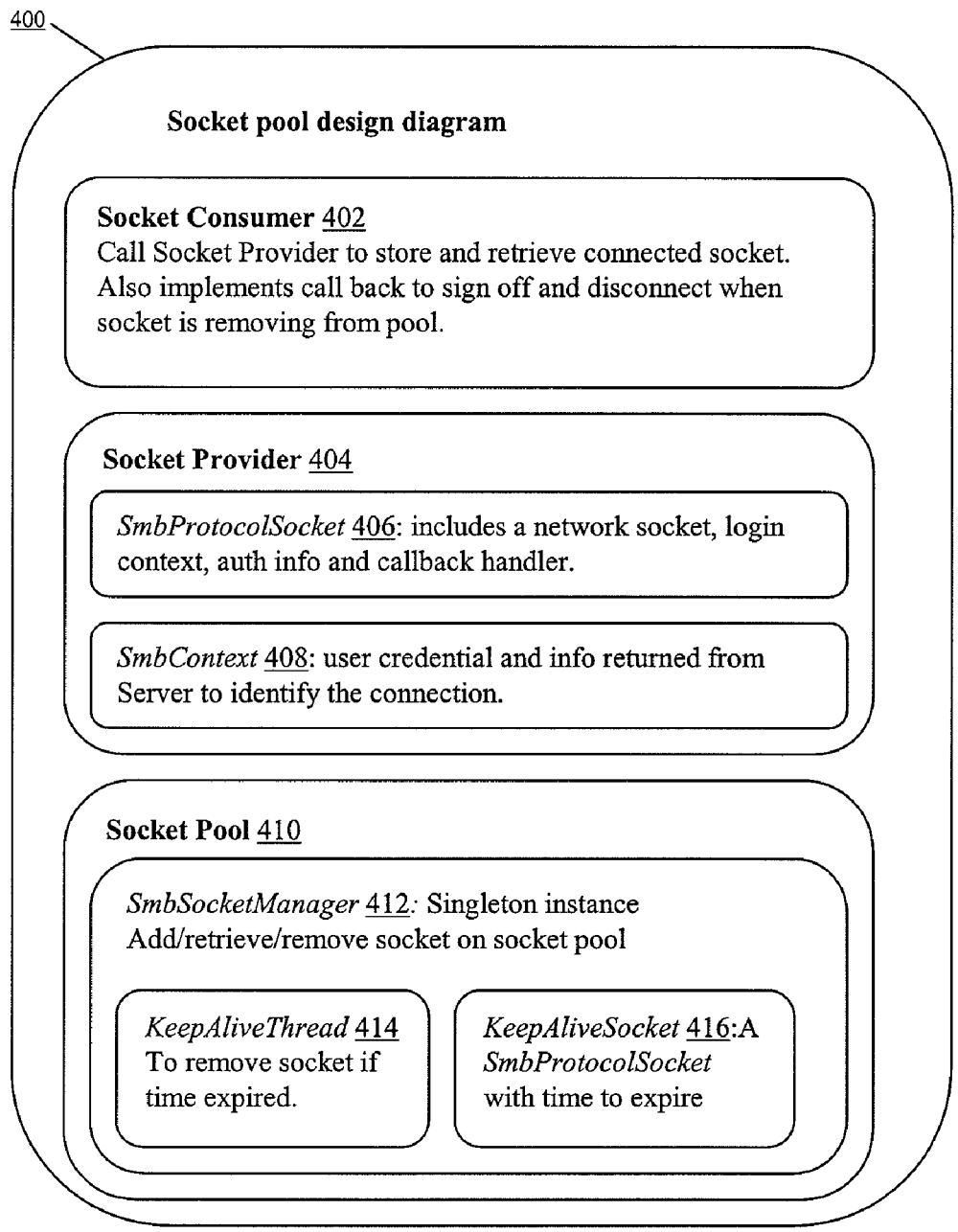
FIG. 4 is a diagram illustrating an example of a socket pool design.

FIG. 4 is a diagram illustrating an example of a socket pool design. As noted above, the creation of a socket typically requires some form of network negotiation, which utilizes time and resources of the network. Further, the use of multiple sockets at the same time may lower system resources, possibly causing the client to become constrained.

Accordingly, socket pool design 400 may be used to centrally manage connected sockets internally. Also, socket pool design 400 may be used to address socket security problems. Socket security deals with other processes binding to a port that an existing application already has a socket bound to. If a socket port is stolen by another process, the hijacking port can potentially start receiving traffic on the stolen interface(s) and port.

As can be seen in FIG. 4, socket pool design 400 may include socket consumer 402 and socket provider 404. Socket pool design 400 may further include socket pool 410. Socket consumer 402 may utilize a network socket to communicate with server 104. Socket consumer 402 may include several classes and functions. For the classes, functions and flows depicted in FIGS. 4 to 8, SMB is depicted as the protocol. In this regard, SMB may also be referred to as Common Internet File System (CIFS). The corresponding descriptions apply to both SMB and CIFS.

However, it should be noted that protocols in addition to SMB can apply (e.g., LDAP and SOAP). More particularly, any protocol that relies on a given socket instance as a means of establishing a user/authentication context may be used instead of SMB. The difference in operation can be the parameters used for the protocols. Also, the name of the classes may differ among protocols (e.g., SmbSocketListener for SMB, SoapSocketListener for SOAP and LdapSocketListener for LDAP). Accordingly, the class names described herein are merely exemplary in nature, and other class names may be used.

Socket consumer 402 may include a class SmbFile and its base class SmbConnect (both not shown), to acquire and store connected sockets via socket provider 404, in socket pool 410. Socket consumer 402 may further include a SmbSocketListener interface (not shown) which may register for callbacks from socket pool 410, when a connection is about to be removed from socket pool 410. For example, a callback can notify socket consumer 402 (or caller) that a specific socket is about to be removed, so that socket consumer 402 can perform the necessary cleanup operations.

In this way, socket consumer 402 can sign off from server 104 and close a socket properly. It should be noted that this operation is typically only performed for protocols where server 104 is required to perform a signoff operation. For example, the SMB protocol typically requires the server to perform a signoff operation, while the SOAP protocol does not.

Socket pool design 400 may further include socket provider 404, which may access a connected socket within socket pool 410. Socket provider 404 may include several classes and functions. For example, SmbConnection (not shown) may provide methods to obtain a connected socket and to store a socket connection into socket pool 410.

Socket Provider 404 may further include SmbContext 408, which may include a user's login credential, and information returned from server 104 during the message exchange. In this regard, credential information can be stored in socket consumer 402 after a socket is authenticated with server 104. The credential information may be stored in a reusable socket's context object (e.g., SmbContext 408), in local memory. The credential information can be serialized, so that the caller can retrieve this information from a single data entity. For example, such a single data entity may be usable for both NT LAN Manager (NTLM) and Kerberos credential information.

To generate the credential information, a separate security library (e.g., one which supports Kerberos and NTLM authentication) can be used. There may be several options to use this library. For example, one option is having the application call the library first to perform the desired authentication method. The authentication information can then be passed to the library that utilizes the socket pool mechanism. Alternatively, the application can pass user credentials directly to the library itself. In both cases, the credential information can be stored in the local memory with some hashing, encrypting or serializing mechanisms, so as to prevent an intruder (e.g., other process) from obtaining stolen password and login user credential information.

As suggested above, for the SMB protocol, the login user's credential may be authenticated with NTLM or Kerberos protocols. The information returned from server 104 may include tree ID (Tid), caller's process ID (Pid), user ID (Uid) and multiplex ID (Mid), all of which may be used to identify the resources and connection between client and server 104.

More specifically, a Tid can correspond to an instance of an authenticated connection to a server resource. Server 104 can return the Tid value to client device 100 when client device 100 successfully connects to a resource. The Tid typically is a 16-bit number that identifies which resource (e.g., disk share or printer) a particular packet is referring to. On the other hand, a Pid can represent a caller process identifier, generated by the client to uniquely identify a process within the client device. A Uid can represent a user ID assigned by the server after a user authenticates to it. The server can associate the Uid with that user until the client requests that the association be broken. Further, a Mid may be used along with Pid to allow multiplexing the single client and server connection among the client's multiple processes, threads, and requests per thread. Clients can have many outstanding requests (up to a negotiated number) at one time.

The above identifiers (e.g., Tid, Pid, Uid and Mid) can be saved in the context of the socket pool, so that the socket can be reused without necessarily having to reconnect to server 104. In other words, by storing user login context and identifiers assigned by the server, a socket can be reused without necessarily having to renegotiate and reconnect with the server. A socket can be reused for all operation types, regardless of what the original operation type is, provided that the operation request meets certain criteria as mentioned above.

It should be noted that the reusable socket can save (or eliminate) the step of authentication operation for protocols (e.g., SMB, LDAP and SOAP). In the SMB case, the reusable socket can save the steps of negotiation of protocol, session setup and tree connect operation for SMB protocol, which will be described in further detail below. In addition, the socket can be reused at the root shared folder, and all associated subfolders can use the authenticated socket directly.

From the server point of view, server 104 typically does not know if the socket is a reused socket or not. If the reused socket saves all the identifiers that returned from server 104, server 104 typically cannot distinguish whether a socket is reused or not. As such, server 104 can treat the socket as an already connected socket.

As suggested above, the socket saved in socket pool 410 can include login user context, as well as a list of identifiers assigned by server 104. For example, server 104 can return Tid, Pid, Uid and Mid when a socket is successfully authenticated and connected. Therefore, all these of these identifiers can be saved, to ensure that client device 100 can talk to the server within the same session.

Still referring to FIG. 4, socket provider 404 may further include SmbProtocolSocket 406, which may include the actual socket(s) for communication with server 104. Further, SmbProtocolSocket 406 may include information returned from server 104 during message exchange, and a corresponding callback handler.

Socket pool design 400 may further include socket pool 410. Socket pool 410 corresponds with the pool of sockets, and may be used independently for implementing protocols such as SOAP, LDAP and SMB, in association with socket consumer 402 and socket provider 404. Socket pool 410 may include several classes and functions, including SmbSocketManager 412.

SmbSocketManager 412 may provide functions to allow socket provider 404 access to a connected socket of socket pool 410. SmbSocketManager 412 may further provide a cleanup method to remove a connected socket. Also, a daemon thread is typically started when the SmbSocketManager 412 class is started, to manage the lifetime of all connections. When an operation is completed, socket consumer 402 may call a function in socket provider 404 to cache a connected socket into socket pool 410 in the idle state for reuse. In this case, the socket will typically be given a lifetime of a specified interval (e.g., 30 seconds). If the socket is not needed within that time period (e.g., if another operation on the same share is not requested), the socket will typically be removed from socket pool 410 and a callback event will typically be sent to the caller for a cleanup operation. In the implementation of SMB, the SmbConnect will typically receive this callback event and perform the sign off and disconnect operations.

In this regard, SmbSocketManager 412 may include class KeepAliveThread 414. KeepAliveThread 414 may correspond with a daemon thread to remove a socket from socket pool 410, when the lifetime of a socket has expired. Further, KeepAliveSocket 416 may include a SmbProtocolSocket object and a lifetime value. As such, in addition to the number of sockets for creation being configurable, the lifetime of a specific socket can be configurable. Also, the frequency of checking if a socket should be removed is configurable. It should be noted that the class names described herein (e.g., KeepAliveSocket, SmbProtocolSocket) are merely exemplary, and other class names may be used.

Thus, socket pool design 400 of FIG. 4 may reduce the amount of system resources for creation and maintaining of sockets. More specifically, socket pool design 400 may centrally manage connected sockets internally. In addition, socket pool design 400 typically provides the flexibility to configure sockets within a pool. For example, socket pool design 400 can configure the lifetime of connection and the number of connections allowed.

Further, socket pool design 400 may provide for the following: (1) allowing an established connection/session to be reused; (2) internally managing the lifetime of all connections, by removing expired connection from socket pool automatically; (3) associating an authenticated user with a socket connection, thus preventing potential hijacking of a previously established connection by another user of the application (e.g., this is not necessarily accomplished by the default HTTP client provider of the Java JDK); and (4) notifying a caller (or socket consumer 402) that a specific socket is about to close, so that the caller may perform necessary cleanup operations.

Socket pool design 400 is also seen to provide an end-to-end solution to allow client system effective reuses for an authenticated and connected socket. Socket pool 410 can ensure the reusable socket is used with associated user credential will not be stolen or be hijacked (intentionally or inadvertently) from the socket pool level.

Since all the authenticated and connected sockets are typically stored and centrally managed inside socket pool 410, socket pool design 400 can also allow a client application to monitor activities and the lifetime of all sockets used. For example, such monitoring can be useful in detecting if any socket has been abruptly shut down by an intruder for replacement with an attacker's socket.

Figure 5:
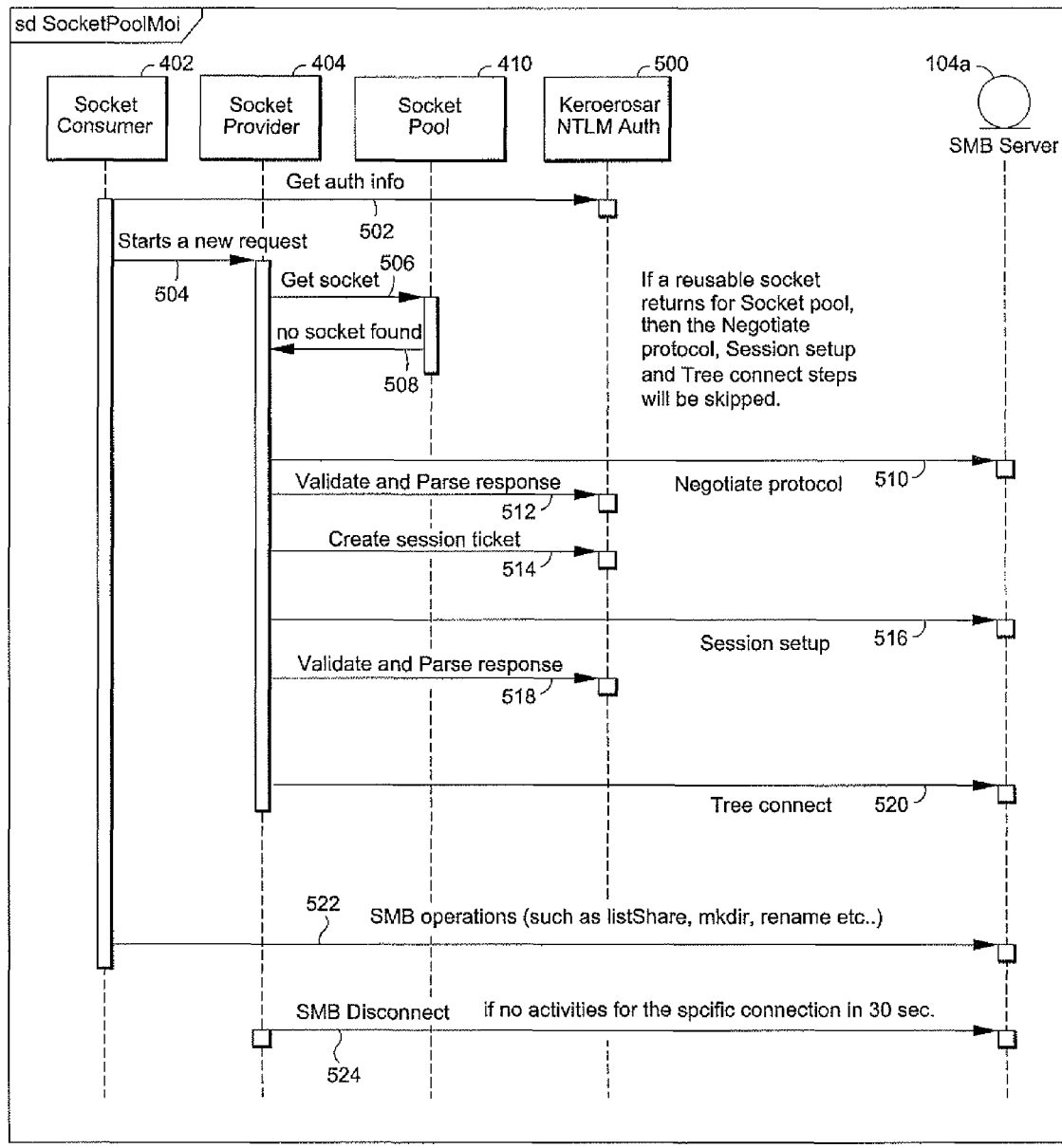
FIG. 5 is a sequence diagram illustrating an exemplary sequence of steps for reusing a socket within a socket pool.

FIG. 5 is a sequence diagram illustrating an exemplary sequence of steps for reusing a socket within a socket pool 410. The diagram of FIG. 5 illustrates an example of operation sequences for client device 100 to create a secure connection with a server 104 (e.g., an SMB client and an SMB server).

As can be seen in FIG. 5, socket consumer 402 can initiate a get authentication information sequence step 502 to a Kerberos (or NTLM) authorization module 500. Socket consumer 402 can then start a new sequence step 504 to socket provider 404. Socket provider 404 can initiate a get socket sequence step 506 to socket pool 410, and socket pool 410 can return a no socket found sequence step 508 to socket provider 404.

If there is no socket returned from socket pool 410, client device 100 (e.g., via socket provider 404) is typically required to perform a negotiate protocol sequence step 510, a session setup sequence step 516 and a tree connect sequence step 520, before starting an operation with server 104 (e.g., SMB server 104*a*). In this regard, the negotiate protocol sequence step 510 may be associated with the validate and parse response sequence step 512 and the create session ticket sequence step 514. Further, session setup sequence step 516 may be associated with the valid and parse response sequence step 518. As this stage, the new socket is typically saved and stored into socket pool 410, along with credential material for the user associated with this socket.

Once the socket provider 404 obtains a socket, socket consumer 402 can perform SMB operations 522 with SMB server 104*a*. To disconnect, socket provider 404 can initiate an SMB disconnect 524 to SMB server 104*a*. Although FIG. 5 depicts the authentication scheme for Kerberos (or NTLM), it should be noted that the authentication scheme can be applied to other protocols.

Figure 6:
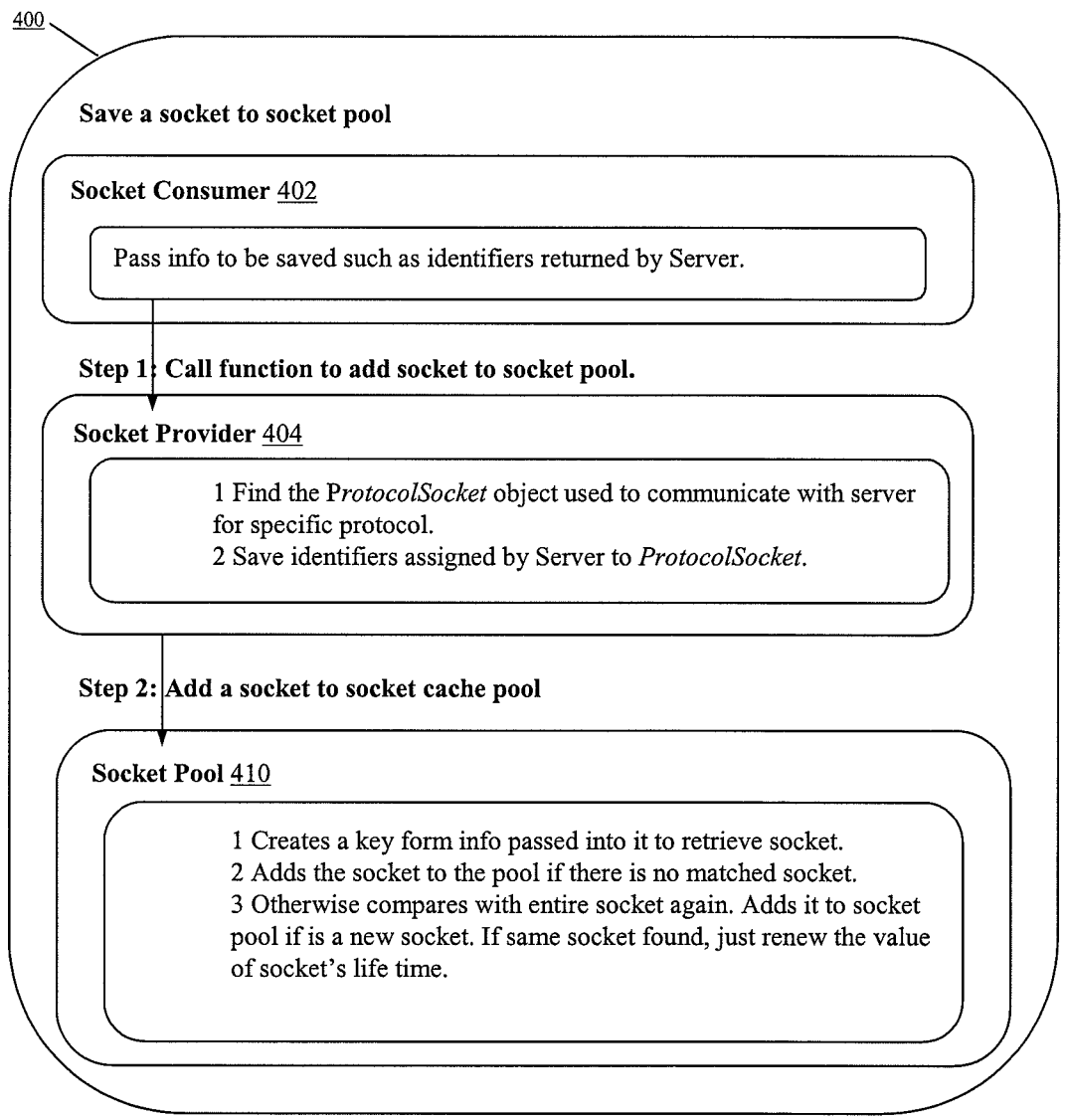
FIG. 6 is a diagram illustrating an example of saving a socket to the socket pool, using the socket pool design of FIG. 4.
Figure 7:
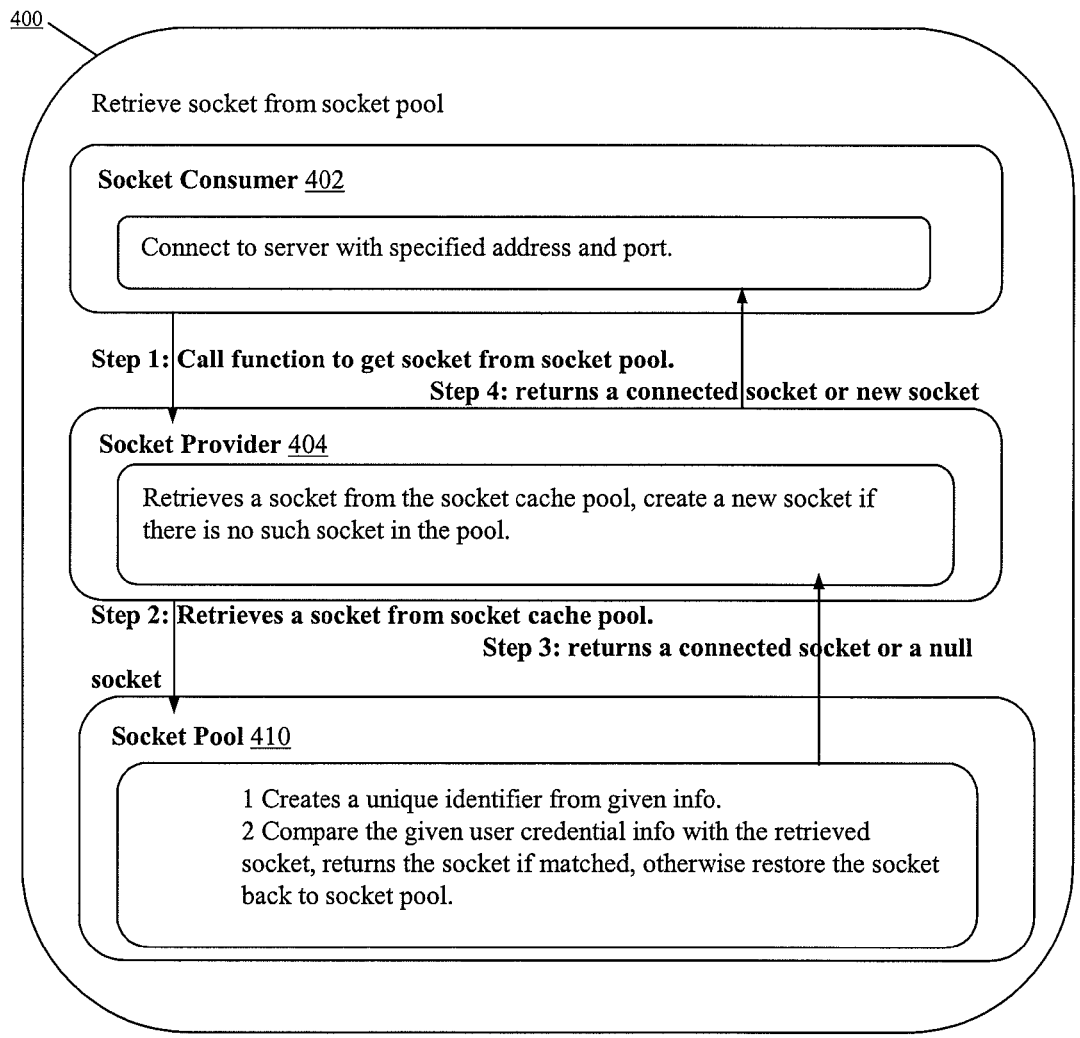
FIG. 7 is a diagram illustrating an example of receiving a socket from the socket pool, using the socket pool design of FIG. 4.
Figure 8:
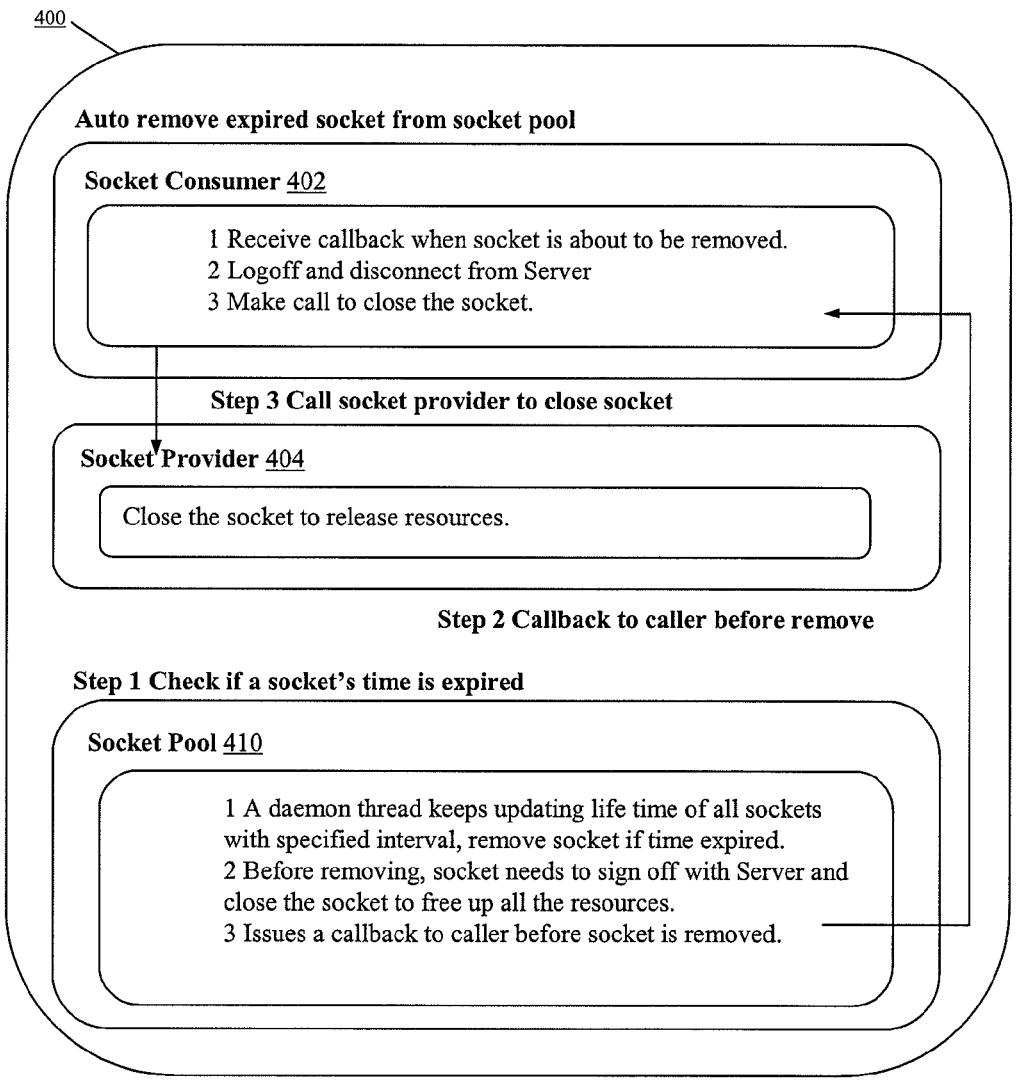
FIG. 8 is a diagram illustrating an example of automatically removing an expired socket from the socket pool, using the socket pool design of FIG. 4.

FIGS. 6 to 8 depict various examples of different operations, using the using the socket pool design of FIG. 4. As demonstrated by these diagrams, a socket can be more easily added to and retrieved from a socket pool, and a new socket instance can be created if it does not exist or is currently being used. Although FIGS. 6 to 8 and their corresponding descriptions relate to SMB, it should be noted that the operation procedures can be applied to other protocols (e.g., LDAP and SOAP) which rely on a given socket instance as a means of establishing a user/authentication context.

With reference to FIG. 6, a diagram illustrating an example of saving a socket to socket pool 410 is shown. When socket consumer 402 is done with an operation, it may call a function in socket provider 404, to save the socket to socket pool 410 for reuse. At this stage, the caller (or socket consumer 402) typically needs to pass the following information to socket provider 404: the identifiers returned from server 104, the lifetime of the socket, the SmbProtocolSocket 406 instance, the socket address and the point number. In the SMB library use case, the identifiers include Uid, Tid, Pid and Mid, as noted above. Further, socket provider 404 can find the SmbProtocolSocket 406 object used to communicate with server 104 for the specific protocol, and can save identifiers assigned by server 104 to SmbProtocolSocket 406.

Meanwhile, when socket pool 410 gets called, it typically will first compose a key to retrieve the socket from socket pool 410, based on the information passed into socket pool 410. If there is no socket found, socket pool 410 will typically create a KeepAliveSocket 416 instance, which includes SmbProtocolSocket 406 instance passed into it and the lifetime of the socket, and save it to socket pool 410. Otherwise, if a matched connected socket is found, socket pool 410 may perform a second search routine, to ensure that the entire socket (e.g., the local port) are matched. If the socket does not match completely, a KeepAliveSocket 416 will typically be created and saved to socket pool 410. However, if there is a matched socket, then there is typically no need to create a KeepAlive-Socket 416 instance, and socket pool 410 can assign the retrieved socket with the new lifetime and save it back to socket pool 410.

One reason to perform the second search routine is because multiple sockets may be returned when retrieving a socket with the composed key. More specifically, during the socket creation step, if a socket is currently in use by socket consumer 402, a similar operation may require that socket for operation. Instead of putting the request in the wait state, socket pool 410 may create a new socket with a different local port, and return it to socket provider 404. This corresponds to a non-blocking operation, which allows socket consumer 402 to perform without necessarily having to wait for the specific socket to be freed. Accordingly, multiple sockets can run at the same in an efficient manner.

FIG. 7 is a diagram illustrating an example of receiving a socket from socket pool 410, using the socket pool design 400 of FIG. 4. Socket consumer 402 can connect to server 104 with a specified address and port. Socket provider 404 can retrieve a socket from the socket cache pool, and create a new socket if there is no such socket in the pool. In doing so, socket provider 404 typically passes a SmbContext object, user information, a server address and a server port number to socket pool 410. Based on this information, socket pool 410 can compose a key to retrieve a connected socket. If a matched socket is found, socket pool 410 can check if the user information also matched, and can return the socket to socket provider 404. Otherwise, socket provider 404 can create a new socket.

Regarding verification of the authentication information from socket pool 410, the socket can be retrieved from socket pool 410 so as to prevent another process and user from using the same port and hijacking the connection to server 104, whether intentionally or unintentionally. For example, a key (or socket identifier) can include a complete path of the connection based on the user. For example, the key format can be as follows: hostname+port+username+location of the resource. This is one example of forming the socket so it can be based on a particular user.

In this regard, many protocols (e.g., HTTP, SMB) require user authentication before a given application can communicate with an existing network end-point. Once a user has been authenticated (by sending authentication information via the connected socket), any subsequent requests on that socket instance are associated with the authenticated user.

One socket caching scheme is to simply cache a given socket based on the endpoint that the socket is connected to. This scheme may work when an application only supports one user using a given application instance at one time. However, a problem may arise when a given application instance needs to support multiple users (e.g., credentials) communicating to the same network end-point at the same time. Since this scheme does not associate a given cached socket with a particular user, the application may accidently use an existing cached socket (e.g., which was bound to a user A) to perform request for a different user (e.g., user B).

However, by caching a given socket not only by the endpoint being connected to, but also by the user identification, multiple users may use a given application at the same time. More specifically, socket pool 410 can ensure that the user has the same credential as the socket saved in socket pool 410, before releasing a socket to the caller (or socket consumer 402). Socket pool 410 can compare the login user credential stored in local memory with the login user credential saved in the socket's context object, to ensure that the socket retrieved from socket pool 410 is from the same login user. This type of security is applicable to the NTLM V2 or SPNENGO/Kerberos protocols, among others. If the login credential does not match, then no socket will typically be released from socket pool 410, and the user will typically need to create a new session/socket.

FIG. 8 is a diagram illustrating an example of automatically removing an expired socket from socket pool 410, using the socket pool design of FIG. 4. As mentioned above, a daemon thread is typically started when the SmbSocketManager class 412 of socket pool 410 is started. A single daemon thread can monitor all the sockets in socket pool 410. As can be seen in FIG. 8, in socket pool 410, a daemon thread can keep updating the lifetime of all sockets with specified intervals (e.g., 30 seconds), and can remove a socket if its lifetime has expired. Before socket pool 410 performs such removal, the socket typically needs to sign off with server 104 and to close the socket, in order to free up all the resources. Socket pool 410 can also issue a callback to caller before the socket is removed. Socket consumer 402 can receive a callback when the socket is about to be removed, and can log off and disconnect from server 104. Socket consumer 402 can also make a call to close the socket. Further, socket provider 404 can close the socket, to release the resources associated therewith. In this way, virtually all of the resources will be released programmatically when an application is shut down.

In other words, whenever an operation is complete, the socket consumer 402 can cache the connected socket to the pool in the idle state for reuse. The socket can also be given a lifetime of a specified interval (e.g., 30 seconds). If the socket is not needed within that lifetime (e.g., in the SMB case, if another operation sharing the same socket), it will typically be removed from socket pool 410, and a callback event will typically be sent to the caller (or socket consumer 402) for necessary cleanup operations.

For the SMB protocol, the SmbConnect can receive the callback event so the application can perform the sign off and disconnect operation and then close the network socket. For any protocol that associates an authenticated user with a particular socket (e.g., SOAP, HTTP), the application only needs to close the socket, and there is typically no need to sign off to disconnect from server 104.

Figure 9:
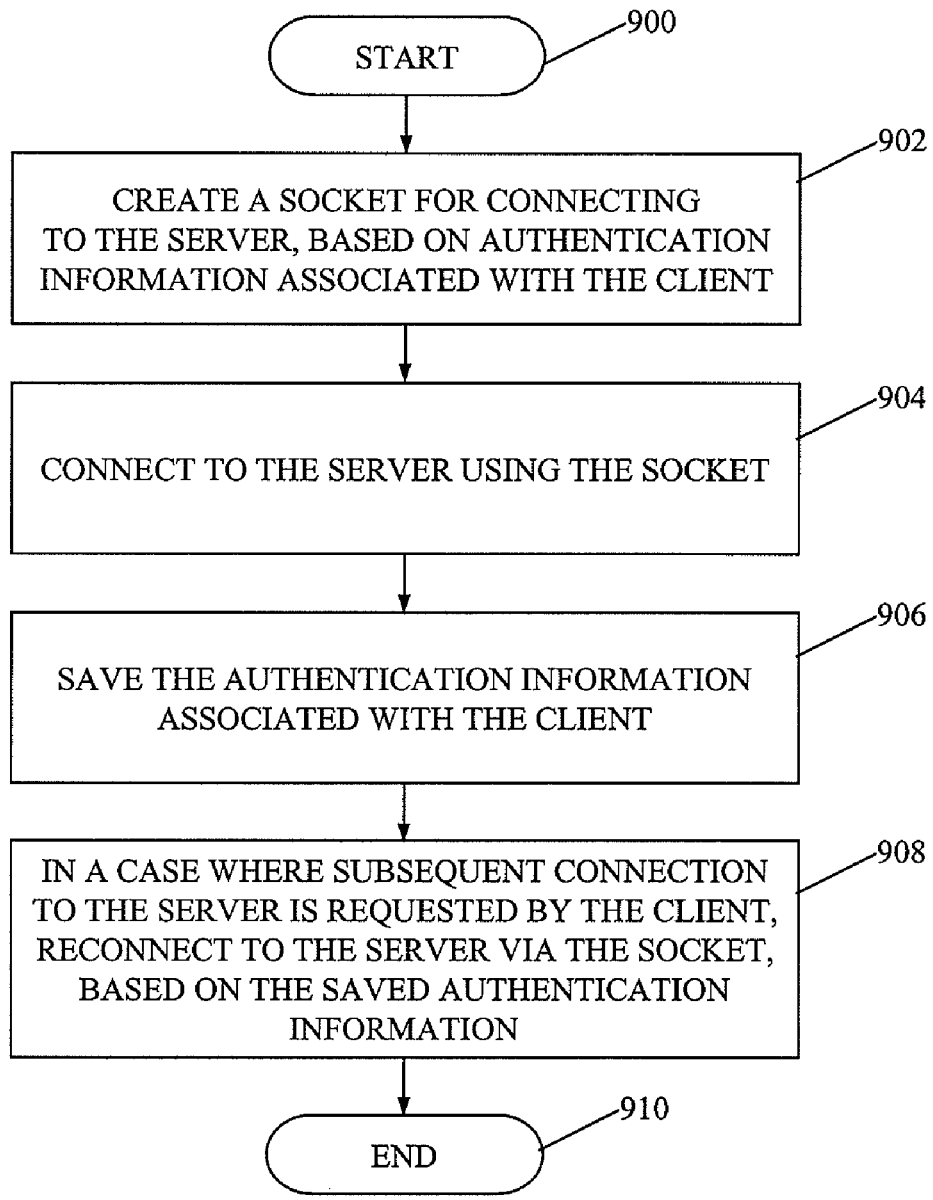
FIG. 9 is a flowchart illustrating an example of establishing and maintaining a connection by a client to a server within a network.

FIG. 9 is a flowchart illustrating an example of establishing and maintaining a connection by a client to a server within a network. Following start bubble 900, the client creates a socket for connecting to the server, based on authentication information associated with the client (block 902). The client connects to the server using the socket (block 904). The client saves the authentication information associated with the client (block 906). In a case where subsequent connection to the server is requested by the client, the client reconnects to the server via the socket, based on the saved authentication information (block 908). The process then ends (end bubble 910). Among other things, this establishing and maintaining of a connection typically reduces system resources, by centrally managing all sockets in a socket pool internally.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for establishing and maintaining a connection by a client to a server within a network, the method comprising:

creating a socket for connecting to the server based on authentication information associated with the client, the socket comprising a context object;

connecting to the server using the socket;

saving the authentication information associated with the client in the context object of the socket;

in a case where subsequent connection to the server is requested by the client, determining if the authentication information saved in the context object of the socket matches authentication information of the client for the subsequent connection;

in a case where it is determined that the authentication information saved in the context object of the socket matches the authentication information of the client for the subsequent connection, reconnecting to the server via the socket;

in a case where it is determined that the saved authentication information does not match the authentication information of the client for the subsequent connection, creating a new socket for connecting to the server, based on the authentication information of the client for the subsequent connection; and connecting to the server using the new socket.

2. A method according to claim 1, wherein the client comprises an application, and wherein the authentication information corresponds to a user and is associated with the application of the client.

3. A method according to claim 2, wherein the client comprises plural applications, and wherein the client establishes and maintains separate sockets for the plural applications.

4. A method according to claim 1, wherein the saving comprises:

saving the authentication information associated with the client in a cache of the client.

5. A method according to claim 1, further comprising: saving socket identifier information for identifying the socket.

6. A non-transitory computer-readable storage medium storing a computer-executable program for establishing and maintaining a connection by a client to a server within a network, the program comprising code for:

creating a socket for connecting to the server, based on authentication information associated with the client, the socket comprising a context object;

connecting to the server using the socket;

saving the authentication information associated with the client in the context object of the socket; and in a case where subsequent connection to the server is requested by the client, determining if the authentication information saved in the context object of the socket matches authentication information of the client for the subsequent connection;

in a case where it is determined that the authentication information saved in the context object of the socket matches the authentication information of the client for the subsequent connection, reconnecting to the server via the socket;

in a case where it is determined that the saved authentication information does not match the authentication information of the client for the subsequent connection, creating a new socket for connecting to the server, based on the authentication information of the client for the subsequent connection; and connecting to the server using the new socket.

7. A computer-readable storage medium according to claim 6, wherein the client comprises an application, and wherein the authentication information corresponds to a user and is associated with the application of the client.

8. A computer-readable storage medium according to claim 7, wherein the client comprises plural applications, and wherein the client establishes and maintains separate sockets for the plural applications.

9. A computer-readable storage medium according to claim 6, wherein a network protocol for establishing and maintaining the connection is one of Server Message Block (SMB), Lightweight Directory Access Protocol (LDAP) and Hypertext Transfer Protocol (HTTP).

10. A computer-readable storage medium according to claim 6, wherein the saving comprises code for:

saving the authentication information associated with the client in a cache of the client.

11. A computer-readable storage medium according to claim 6, the program further comprising code for:

saving socket identifier information for identifying the socket, wherein the reconnecting comprises code for reconnecting to the server via the socket, based on the saved authentication information and the saved socket identifier information.

12. An apparatus for establishing and maintaining a connection by a client to a server within a network, the apparatus comprising a processor configured to:

create a socket for connecting to the server, based on authentication information associated with the client, the socket comprising a context object;

connect to the server using the socket;

save the authentication information associated with the client in the context object of the socket; and in a case where subsequent connection to the server is requested by the client, determine if the authentication information saved in the context object of the socket matches authentication information of the client for the subsequent connection;

in a case where it is determined that the authentication information saved in the context object of the socket matches the authentication information of the client for the subsequent connection, reconnect to the server via the socket;

in a case where it is determined that the saved authentication information does not match the authentication information of the client for the subsequent connection, create a new socket for connecting to the server, based on the authentication information of the client for the subsequent connection; and connect to the server using the new socket.

13. An apparatus according to claim 12, wherein the client comprises an application, and wherein the authentication information corresponds to a user and is associated with the application of the client.

14. An apparatus according to claim 13, wherein the client comprises plural applications, and wherein the client establishes and maintains separate sockets for the plural applications.

* * * * *